(No Model.)
J. D. LAWLOR.
TREADLE FOR SEWING MACHINES.
No. 253,212. Patented Feb. 7, 1882.
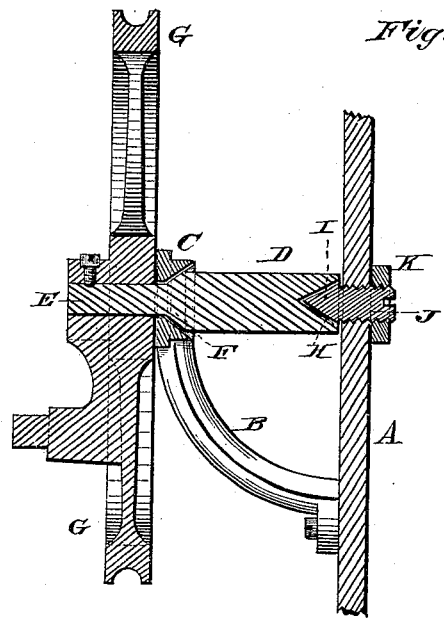
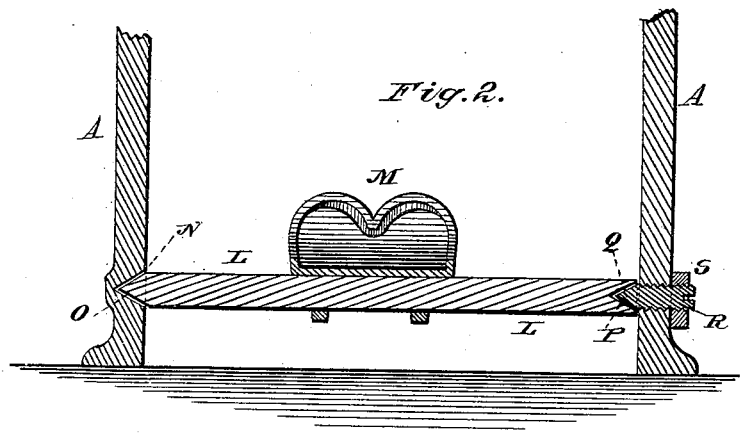
WITNESSES
Fred. G. Dieterich
P. H. Dieterich
INVENTOR
John D. Lawlor,
by C. A. Snow & Co.
Attorneys
N. PETERS, Photo-Lithographer, Washington, D. C.

UNITED STATES PATENT OFFICE.

JOHN D. LAWLOR, OF MONTREAL, QUEBEC, CANADA.

TREADLE FOR SEWING-MACHINES.

SPECIFICATION forming part of Letters Patent No. 253,212, dated February 7, 1882.

Application filed December 20, 1881. (No model.)

*To all whom it may concern:*

Be it known that I, JOHN D. LAWLOR, of Montreal, in the Province of Quebec and Dominion of Canada, have invented certain new and useful Improvements in Band-Wheels and Treadles for Sewing-Machines; and I do hereby declare that the following is a full, clear, and exact description of the invention, which will enable others skilled in the art to which it appertains to make and use the same, reference being had to the accompanying drawings, which form a part of this specification.

Figure 1 is a vertical sectional view of the band-wheel, taken through its axle; and Fig. 2 is a similar view of the treadle.

Similar letters of reference indicate corresponding parts in both figures.

This invention relates to the axles or spindles for the band-wheels and treadles of sewing-machines and similar light machinery; and it consists in certain improvements in the construction of the same, having for their object to insure light running and to facilitate the taking up of slack caused by wear upon the spindles, as will be hereinafter fully described, and particularly pointed out in the claim.

In the drawings hereto annexed, A represents one side of the table-frame of a sewing-machine, which is provided with a suitably-constructed bracket, B, having a conical box or bearing, C, for the band-wheel spindle D. The latter is provided with an end, E, of reduced diameter, which projects from the conical shoulder or bearing F, through the box C, and carries the band-wheel G, which may be keyed or otherwise secured upon the end E of the spindle. The rear end of the spindle has a conical recess, H, to receive the correspondingly-shaped point I of a screw, J, inserted from the outside through a suitable threaded opening in the frame A, on the outer side of which it is provided with a jam-nut, K, to retain it securely in the position to which it may be adjusted. The bearings of the spindle, it will be observed, are formed by the shoulder F in box C and by the recess H on point I of nut J. Should the bearings become worn, so as to cause the wheel to run unevenly or unsteadily, the defect may at once be remedied by tightening the screw J. If, on the other hand, the wheel should run too hard, the screw J may be loosened, and it will then be found to run freely.

The axle L of the treadle M is provided at one end with a conical point, N, having its bearing in a recess, O, in one side of the table-frame. The other end of axle L is provided with a conical recess, P, to receive the correspondingly-shaped point Q of a screw, R, adjusted in the other side of the table-frame, and equipped with a jam-nut, S. By loosening or tightening the screw R the bearings of the axle may be loosened or tightened as required.

From the foregoing description, taken in connection with the drawings hereto annexed, the advantages and operation of my invention will be readily understood. It is simple, convenient, and easily adjusted.

I do not broadly claim a conical or compensating journal-bearing, as I am well aware that such is old and well known; but,

Having thus described my invention, I claim and desire to secure by Letters Patent of the United States—

The combination, with a suitable frame, of a shaft having at one end a conical point or shoulder fitting in a bearing in said frame, and at its other end a conical recess to receive a conical-pointed screw adjustable in said frame, a jam-nut adjustable upon said set-screw, and a band-wheel or treadle rigidly mounted upon said shaft, as set forth.

In testimony that I claim the foregoing as my own I have hereto affixed my signature in presence of two witnesses.

JOHN DENNIS LAWLOR.

Witnesses:
F. FITZPATRICK,
W. E. JUDGER.